United States Patent

Lücking et al.

[11] Patent Number: 5,617,964
[45] Date of Patent: Apr. 8, 1997

[54] LIFTING MEANS FOR LOADS

[75] Inventors: Manfred Lücking; Burkhard Mende, both of Essen, Germany

[73] Assignee: Krupp Fordertechnik GmbH, Duisburg, Germany

[21] Appl. No.: 331,562

[22] PCT Filed: Jun. 1, 1993

[86] PCT No.: PCT/EP93/01367

§ 371 Date: Oct. 28, 1994

§ 102(e) Date: Oct. 28, 1994

[87] PCT Pub. No.: WO93/25464

PCT Pub. Date: Dec. 23, 1993

[30] Foreign Application Priority Data

Jun. 13, 1992 [DE] Germany .......................... 42 19 370.2

[51] Int. Cl.⁶ .................................................... B66C 17/04
[52] U.S. Cl. ..................... 212/327; 212/319; 294/81.4; 901/16
[58] Field of Search .......................... 212/273, 274, 212/319, 308, 327, 341, 343, 344; 901/22, 27, 28, 16; 294/81.4

[56] References Cited

U.S. PATENT DOCUMENTS

| 2,822,094 | 2/1958 | Greer | 212/319 |
|---|---|---|---|
| 4,433,952 | 2/1984 | Glickman | 212/344 |
| 4,883,388 | 11/1989 | Cherbonnier | 212/308 |
| 4,988,244 | 1/1991 | Sheldon et al. | 901/22 |
| 5,129,279 | 7/1992 | Rennex | 74/479 |

FOREIGN PATENT DOCUMENTS

| 299551 | 1/1989 | European Pat. Off. | 901/27 |
|---|---|---|---|
| 2019046 | 8/1973 | Germany . | |
| 2604046 | 8/1976 | Germany | 212/250 |
| 3636459A1 | 4/1988 | Germany . | |
| 3737082C2 | 3/1990 | Germany . | |
| 4005194A1 | 8/1990 | Germany . | |
| 611772 | 5/1978 | U.S.S.R. | 901/28 |
| 1277001 | 6/1972 | United Kingdom . | |
| 89/09120 | 10/1989 | WIPO | 901/28 |

Primary Examiner—Thomas J. Brahan
Attorney, Agent, or Firm—Herbert Dubno

[57] ABSTRACT

A lifting device intended to support a load without pendulum movement has at least six hydraulic control cylinders connected by individual articulations to a horizontally movable support above the load and to a load lifter below that support. At least four of the control cylinders are mutually oblique. The articulations in each case allow swiveling action about two mutually perpendicular axes.

9 Claims, 4 Drawing Sheets 5,617,964

LIFTING MEANS FOR LOADS

CROSS REFERENCE TO RELATED APPLICATIONS

This application is a national phase of PCT/EP 93/01367 filed 1 Jun. 1993 and based upon German National application P42 19 370.2 filed 13 Jun. 1992 under the International Convention.

FIELD OF THE INVENTION

The invention relates to a lifting means comprising a horizontally movable construction part and a load receiving means which can be raised and lowered in relation to the former, suspended from the construction part by elements adapted to be subjected to tensile loads and adapted to be rigidly connected to a load. The mobile construction part can be a crane trolley designed to travel on a bridge or an overhead travelling crane, but it may also be part of a jib or portal of a crane vehicle. The mobile construction part may thus be moved in relation to another mobile part of a lifting means (e.g. as a crane trolley in relation to the likewise mobile girder of an overhead travelling crane) or as a fixed part of a lifting means which is horizontally movable as a whole (e.g. a portal crane). The load receiving means may in particular be designed as a spreader for containers, semi-trailers etc. It is important that the load receiving means, when the load is trans-loaded is firmly connected to the load so that in the course thereof no relative movements between the load and the load receiving means can take place.

BACKGROUND OF THE INVENTION

In the reloading of containers, interchangeable superstructures, road truck units etc. these are raised and lowered vertically and are moved horizontally. In order to obtain high reloading rates, short movement periods are desired involving high accelerations and correspondingly high transverse forces.

Where load receiving means are suspended from ropes the travelling movements of the crane trolley and/or bridge result in swinging movements of the load receiving means, whereby a rapid gripping of the load is impeded. Where the load has already been picked up pendulum-like oscillations take place whereby an accurate setting down of the load, e.g. onto the chassis of a vehicle, is made quite difficult. The problem of pendulum movement also may result from wind action.

Although pendulum damping means are known in which the ends of the ropes are fixed to hydraulic cylinders, the operation of the hydraulic cylinders requires considerable control effort which can only reduce the problem of pendulum movements but can never eliminate it entirely.

Where the load receiving means are suspended from ropes which for trans-loading are to be firmly connected to the load the problem exists, in particular where the load is askew, that the load receiving means must be brought into the correspondingly askew position. Such positioning, in known apparatus involving traction ropes, is brought about by the aforesaid hydraulic cylinders. In spite of the control means required therefore considerable time delays may result where the load is in an askew position because of gravitational effects.

A particular problem results if the load—seen in a plan view—is angularly displaced in relation to the load receiving means. A pivoting of a load receiving means suspended from ropes is possible only to a lesser degree and with extraordinary effort.

OBJECT OF THE INVENTION

Accordingly it is an object of the invention to provide a lifting means as set out in the introduction, so improved that pendulum movements of the load receiving means and, where applicable of the load gripped thereby, in relation to the mobile construction part can be avoided in a simple manner, whereby the transloading rate can be increased. Moreover the load receiving means should be adapted to be more readily positioned in order to grip a load.

SUMMARY OF THE INVENTION

This object is attained in accordance with the invention in that the elements adapted to be subjected to tensile loads are formed by at least six longitudinally individually adjustable hydraulic control cylinders, each being linked by way of a three-dimensionally movable linkage to the mobile construction part and to the load receiving means, at least four of the control cylinders being obliquely oriented.

The control cylinders may allow fixing of their prevailing length. Accordingly, in particular due to the obliquely positioned control cylinders, a rigid connection results between the mobile construction part and the load receiving means. Accordingly, the undesired pendulum movement of the load receiving means and the load cannot occur.

Apart from raising and lowering of the load, it is also possible for the load receiving means and, where appropriate, the load fixed thereto, to be inclined by the control cylinders—in relation to the horizontal normal position—and—viewed in plan view—to be turned about a vertical axis.

The control cylinders, being double-acting hydraulic cylinders, are obviously also pressure-loadable. However, since they are predominantly subjected to tensile load, the extended control cylinders are not subject to buckling problems.

A particularly advantageous embodiment of the invention comprises the feature that six control cylinders are provided, that the linkage connections of the control cylinders, both to the mobile construction part as well as to the load receiving means, are arranged on an imaginary circle and that the angle between the n-th linkage and the (n+2)-th linkage (e.g. the first and third linkage, the second and fourth linkage, etc) amounts to 120°, that the angle between two immediately successive linkages alternatingly amounts to 60° to 120°, preferably 90° to 120°, and 0° to 60°, preferably 0° to 30° and that the center points between any immediately succeeding linkage points on the mobile construction part and the center points between any two immediately succeeding linkages on the load receiving means—viewed in plan view—are mutually staggered by 60° when the effective lengths of the control cylinders are equal.

Due to the pair-wise arrangement of the control cylinders with alternating inclinations, it is merely necessary to pressurise the control cylinders to equal loads when raising or lowering the load receiving means and where applicable the load engaged thereby, whereby the piston rods are synchronously extended or retracted.

An inclined position of the load receiving means is attained in a very special case in that two adjoining control cylinders, the linkages of which to the mobile construction part are far apart and those to the load receiving means are closely together, are synchronously modified with regard to their effective length, whereas the other four control cylinders retain their effective length essentially unchanged.

In order to pivot the load receiving means about a vertical axis, each second control cylinder has its length changed to the same degree and the respectively intermediate control cylinders are changed to approximately the same extent in the opposite sense.

The imaginary circle, on which the control cylinders are linked to the load receiving means, may in this context be of lesser diameter than the imaginary circle, on which the control cylinders are linked to the mobile construction part.

Since the control cylinders are in each case fitted to the periphery, it is possible for the energy and data transmission lines to be passed through the unoccupied central region.

In principle, the lifting means comprising a mere six control cylinders is the most economical. However, it is also possible to provide a linkage of 6+2 n control cylinders (n=1, 2, . . . ) each on an imaginary circle to the mobile construction part and the load receiving means. The angle between two immediately succeeding linkages would then be 360°/(6+2 n) up to 360°/(3+n) respectively 0° to 360°/(6+2 n).

In another preferred embodiment of the invention eight control cylinders are provided, of which four—in the event of purely vertical load effects—are arranged vertically and—viewed in plan view—are provided at the corners of an imaginary rectangle. In the four imaginary planes between any two control cylinders, an inclined control cylinder is provided, the inclination of the inclined control cylinders in any two of the imaginary parallel planes being in opposite directions.

In this embodiment the lifting work proper is performed by the vertical control cylinders and the pivoting of the load receiving means about a vertical axis is brought about by the inclined control cylinders.

In this context it is advantageous if the imaginary rectangle formed by the vertical control cylinders is a square, since the inclined control cylinders may then be subjected to uniform pressures for pivoting purposes. The tilting, respectively inclining of the load receiving means in relation to its horizontal basic orientation, is essentially brought about by the vertical control cylinders.

The control cylinders are preferably linked by way of their casings to the mobile construction, and also preferably by their closed ends to the casing. This offers the advantage of a relatively simple construction and that the control cylinders are afforded adequate freedom of movement.

If it is important for the distance between the mobile construction part and the load receiving means to be as small as possible, the cylinder casings of the control cylinders may also be linked to the mobile construction part at a position remote from the closed end.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
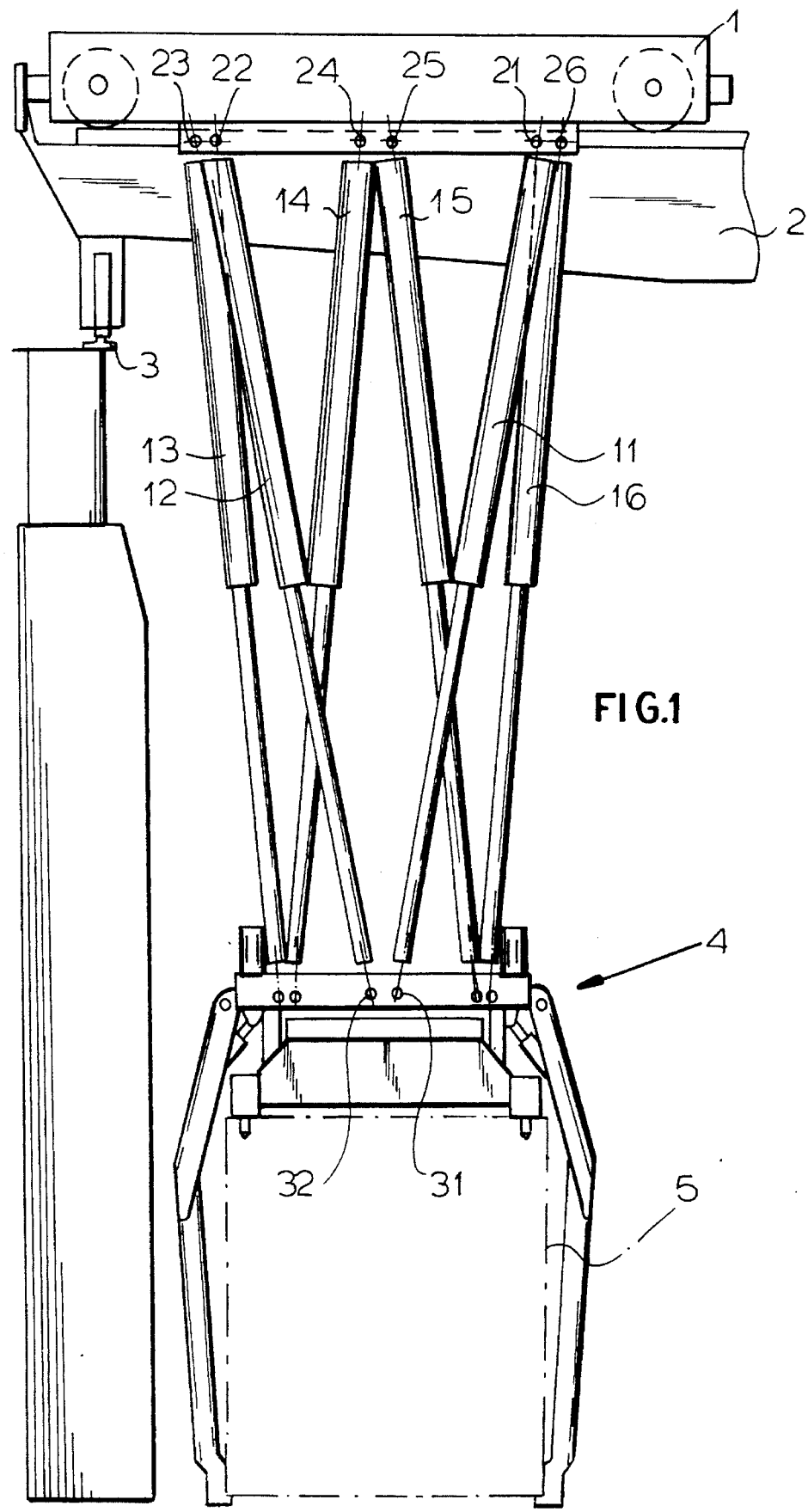
FIG. 1 is a side-elevational view of a lifting means according to the invention for handling a spreader for containers suspended from a crane trolley.

A trans-loading crane in the form of a an overhead travelling crane comprises a crane trolley 1, adapted to travel on a bridge girder 2 (FIG. 1 from the right to the left and vice versa). The bridge girder 2 in turn is adapted to travel on stationary rails 3 perpendicular to its own longitudinal dimension (in FIG. 1 normal to the drawing plane). The crane trolley 1 thus represents a construction part which can be moved at will in a horizontal plane.

A spreader 4 for gripping containers 5 is provided underneath the crane trolley. A containers is indicated in FIG. 1 by dash dotted lines.

Figure 2:
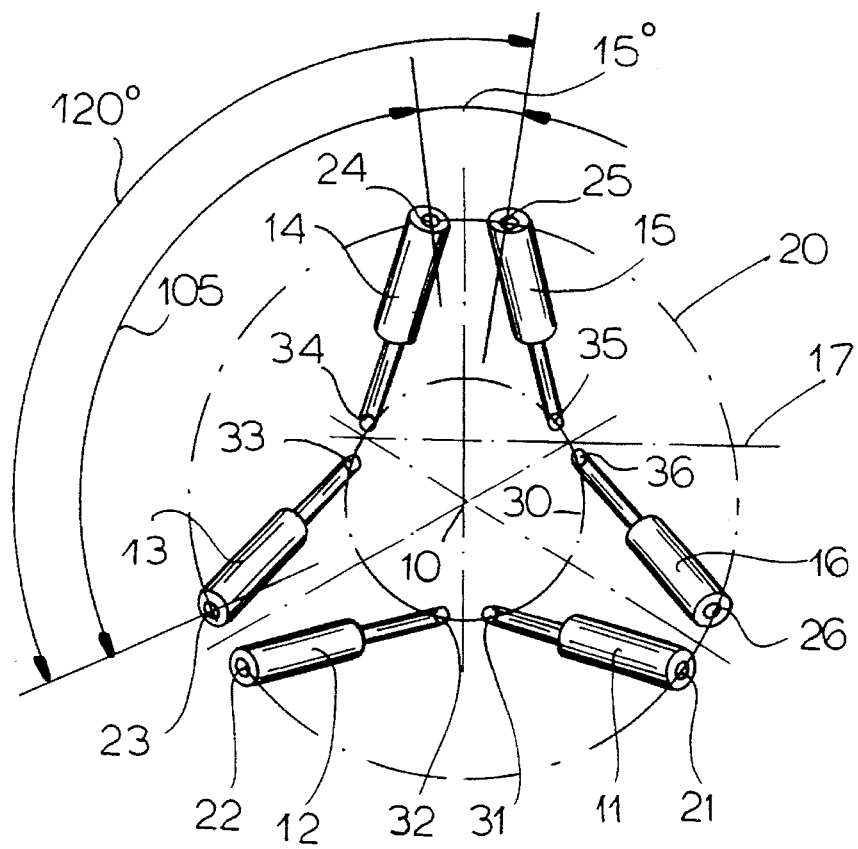
FIG. 2 is a plan view of the control cylinders of the aforesaid lifting means.

The spreader 4 is suspended by way of six hydraulic control cylinders 11 to 16 from the crane trolley 1. The control cylinders 11 to 16 are three-dimensionally movably linked by way of the closed ends of their casings to the underside of the crane trolley 1. The linkage or swivel points 21 to 26, as will be apparent from FIG. 2 are positioned on an imaginary circle 20 having a centre point 10.

The linkage points 21 to 26 are unevenly distributed over the circumference and arranged in pairs, so that between the successive linkage points alternatingly a greater and a lesser distance is provided. The angle between the linkage points 21/23, 23/25 and 25/21—in relation to the centre point 10—amounts uniformly to $2/3\pi \hat{=} 120°$. The angle between the closely adjoining linkage points 22/23, 24/25 and 26/21 amounts to $\pi/12 \hat{=} 15°$, the angle between the widely spaced linkage points, e.g. 23/24 corresponds to $7/12\pi \hat{=} 105°$. The piston rods of the control cylinders 11 to 16 are likewise linked three-dimensionally movably in linkage points 31 to 36 to the spreader 4. The linkage points 31 and 36 are likewise arranged on a circle 30 around a vertical axis through the centre point 10 and are there grouped in pairs. The centres between the linkage points arranged in pairs, e.g. 24/25 on the circle 20, and the centre points of the linkage points combined in pairs, e.g. 35/36 on the circle 30 are—in relation to the vertical through the center point 10—mutually staggered by $\pi/3 \hat{=} 60°$.

For the raising and lowering of the spreader 4 all six control cylinders are uniformly pressurized so that the piston rods are retracted or extended synchronously.

However, if a container 5 in relation to the spreader 4 is mined about a vertical axis through the center point 10, the spreader in order to grip the container must first be swung into the position of such container. For pivoting the spreader 4 in a clockwise direction the piston rods of the control cylinders 12, 14, 16 are retracted and the piston rods of the control cylinders 11, 13, 15 are extended essentially by the same amount. In order to pivot the spreader 4 counterclockwise the pressurizing of the control cylinders proceeds correspondingly in a reverse sense.

The inclining of the spreader 4 in relation to a horizontal plane will be elucidated by way of a particularly simple example: if the control cylinders 13 to 16 are held essentially in their existing position and the two control cylinders 11 and 12 are uniformly extended, that portion of the spreader 4 which in FIG. 2 is lowermost will be lowered and swung about an axis formed by the centres of the linkage points 33/34 and 35/36.

Figure 4:
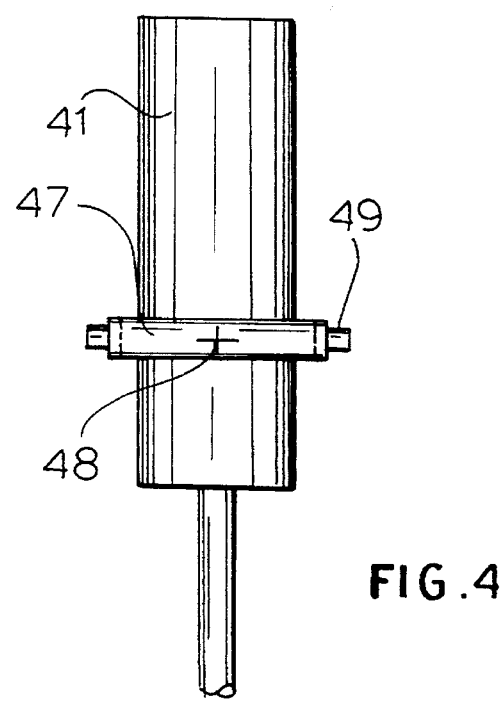
FIG. 4 is an elevational view showing the mounting of a control cylinder of the embodiment according to FIG. 3.
Figure 3:
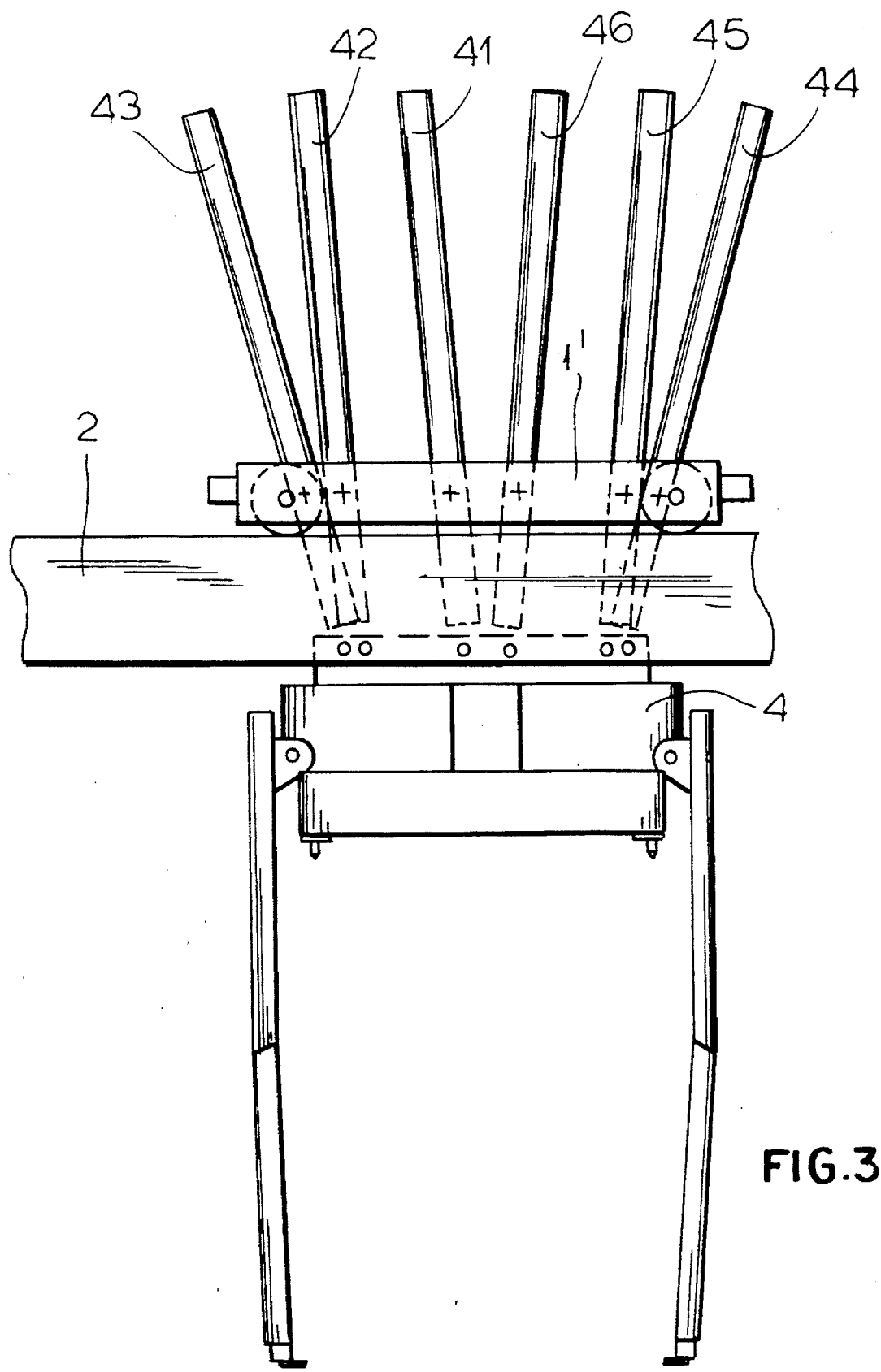
FIG. 3 is a side elevation of another embodiment of the lifting means.

Whereas the control cylinders in the working example according to FIGS. 1 and 2 are linked by way of the closed ends of their casings to the crane trolley 1, FIG. 3 represents a working example in which the control cylinders 41 to 46, with their piston rods retracted and correspondingly raised spreader 4 are linked at a position of the cylinder casing spaced from the closed ends by approximately ⅔ the casing length. In FIG. 4 it is shown for the control cylinder 41 that around the cylinder casing a cardanic ring 47 is fitted which is pivotal about an axis 48 in relation to the cylinder casing. Normal to the axis 48 the cardanic ring 47 comprises two pins 49 which engage into a matching mounting position of the crane trolley 1'.

Figure 5:
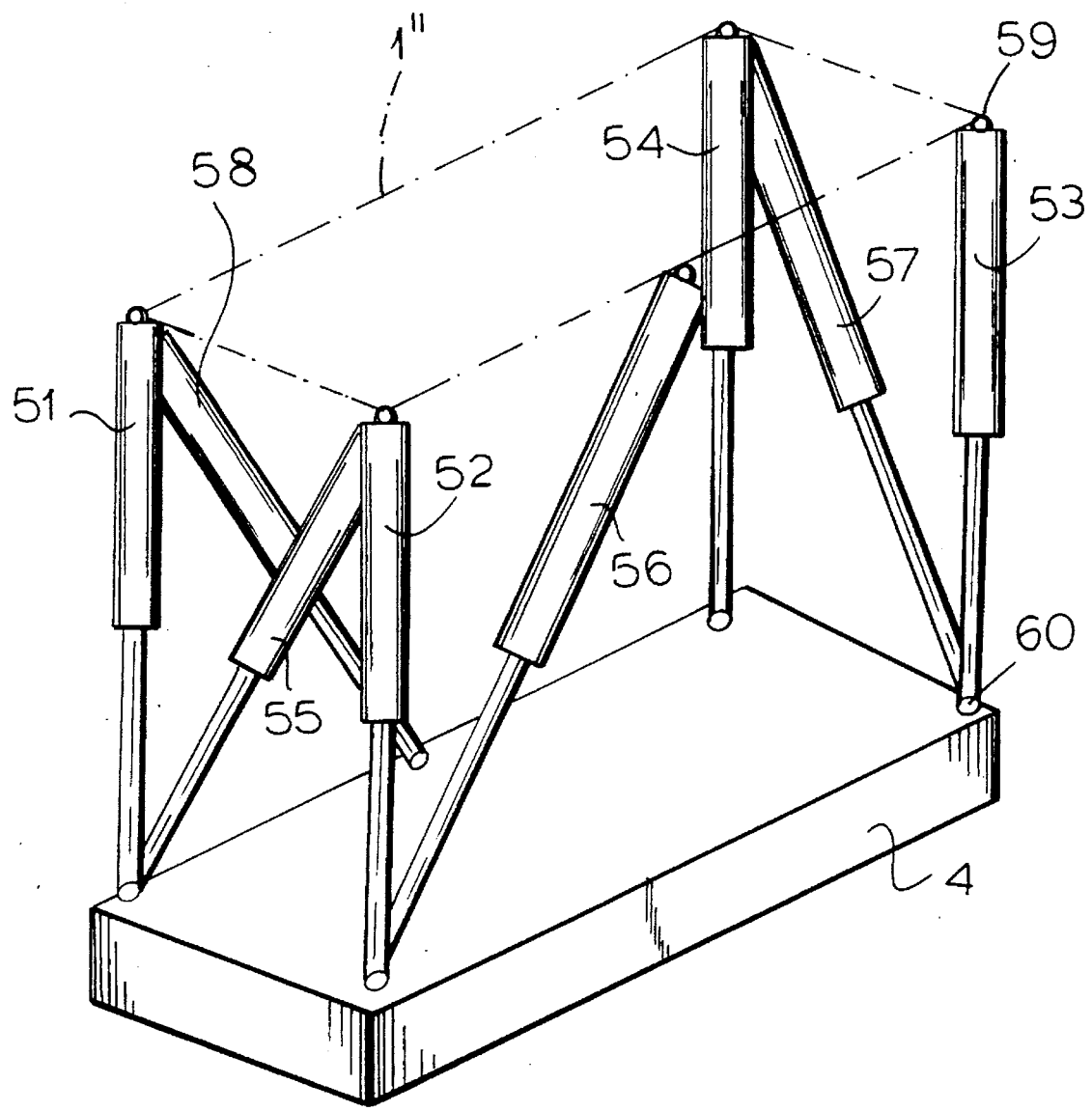
FIG. 5 is a perspective view of a further embodiment of the lifting means.

In the embodiment of FIG. 5 the spreader 4 is suspended from the crane trolley 1" indicated only by dash dotted lines, by way of four vertically arranged control cylinders 51 to 54. Viewed in plan view the control cylinders 51 to 54 are positioned in the corners of a rectangle. Two of these control cylinders at a time form an imaginary plane within which an inclined control cylinder 55, 56, 57 respectively 58 is arranged. All inclined cylinders 55 to 58 have the same angle of inclination, the inclinations of the cylinders within two parallel planes, e.g. 56, 58, being opposite. All cylinders 51 to 58 are connected to the crane trolley 1" and the spreader 4 by way of three-dimensionally movable linkage points 59 respectively 60.

For raising and lowering the spreader 4 the vertical cylinders 51 to 54 are uniformly pressurized so that their piston rods are retracted or extended synchronously. The inclined cylinders 55 to 58 are subjected to a movement prescribed by their inclined position. In order to incline the spreader 4, e.g. about the lowermost linkage points 60 of the control cylinders 51 and 54, the control cylinders 52 and 53 are actuated, resulting in the cylinders 56 and 57 performing a movement prescribed by their inclined position. In order to pivot, i.e. turn the spreader 4 about its vertical axis clockwise, the inclined cylinders 55 to 58 are extended. In order to maintain the height of the spreader 4 the vertical control cylinders 51 to 54 may be subjected to a corresponding longitudinal correction.

We claim:

1. A lifting device comprising:

a horizontal support in the form of a horizontal bridge girder spaced above a load in the form of a container to be lifted and a crane trolley displaceable horizontally on said bridge girder;

means for displacing said support horizontally above said load;

at least six longitudinally adjustable extensible and retractable hydraulic control cylinders extending downwardly from said crane trolley and individually articulated to said crane trolley at spaced apart locations thereon by respective linkages each enabling swiveling of the respective control cylinders about two mutually perpendicular axes relative to said crane trolley; and a container-engaging spreader connected by individual articulations to lower ends of all of said hydraulic control cylinders enabling swiveling of each of the respective lower ends about two mutually perpendicular axes relative to said container-engaging spreader, at least four of said control cylinders being mutually oblique, and said container-engaging spreader being provided with means for gripping said load.

2. The lifting device defined in claim 1 wherein:

said linkages are arrayed around an imaginary circle on said crane trolley;

said articulations are arrayed around an imaginary circle on said container-engaging spreader;

said linkages are angularly spaced in pairs by 120° around said imaginary circle on said crane trolley; and said articulations are provided in pairs spaced angularly by 120° around said imaginary circle on said container-engaging spreader.

3. The lifting device defined in claim 2 wherein:

said linkages are angularly spaced alternately by 105° and by 15°, respectively, around said imaginary circle on said crane trolley.

4. The lifting device defined in claim 2 wherein said imaginary circle of said containing-engaging spreader is of lesser diameter than the imaginary circle of said crane trolley.

5. The lifting device defined in claim 1 wherein eight said control cylinders are provided, said cylinders including four vertical cylinders whose linkages are located at vertices of an imaginary rectangle and another four oblique cylinders each lying in an imaginary vertical plane of any two of the vertical cylinders, the oblique cylinders in mutually opposite imaginary vertical planes being inclined in opposite directions.

6. The lifting device defined in claim 1 wherein said linkages connect casings of said cylinders to said crane trolley.

7. The lifting device defined in claim 6 wherein said linkages are provided at closed ends of said casings.

8. The lifting-device defined in claim 6 wherein said linkages are provided on said casings at locations spaced from closed ends thereof.

9. The lifting device defined in claim 8 wherein said linkages are provided on said casings at locations spaced from closed ends thereof by approximately two-thirds of the length of the respective casing.

* * * * *